US007932687B2

(12) United States Patent
Bastholm

(10) Patent No.: US 7,932,687 B2
(45) Date of Patent: Apr. 26, 2011

(54) ACTUATOR SYSTEM

(75) Inventor: Jeppe Christian Bastholm, Sønderborg (DK)

(73) Assignee: Linak A/S, Nordborg (DK)

( * ) Notice: Subject to any disclaimer, the term of this patent is extended or adjusted under 35 U.S.C. 154(b) by 390 days.

(21) Appl. No.: 12/083,599

(22) PCT Filed: Sep. 11, 2006

(86) PCT No.: PCT/DK2006/000616

§ 371 (c)(1), (2), (4) Date: Apr. 15, 2008

(87) PCT Pub. No.: WO2007/054092

PCT Pub. Date: May 18, 2007

(65) Prior Publication Data

US 2009/0218975 A1 Sep. 3, 2009

(30) Foreign Application Priority Data

Nov. 9, 2005 (DK) ................................ 2005 01548

(51) Int. Cl.
*H02K 17/32* (2006.01)

(52) U.S. Cl. ......................... 318/434; 318/432; 318/433

(58) Field of Classification Search .................. 319/434; 318/432, 433, 400.3, 400.09, 400.15, 811, 318/802

See application file for complete search history.

(56) References Cited

U.S. PATENT DOCUMENTS

| | | | | |
|---|---|---|---|---|
| 3,877,421 | A | 4/1975 | Brown | |
| 5,015,826 | A * | 5/1991 | Curti | 219/492 |
| 6,289,534 | B1 | 9/2001 | Hakamiun et al. | |
| 6,429,642 | B1 * | 8/2002 | Rodilla Sala | 324/142 |
| 6,684,419 | B1 | 2/2004 | Perla | |
| 2005/0097670 | A1 | 5/2005 | Hawk et al. | |
| 2005/0204992 | A1 * | 9/2005 | Shelton et al. | 114/312 |

FOREIGN PATENT DOCUMENTS

| | | |
|---|---|---|
| DE | 19950689 | 11/2000 |
| EP | 0399836 | 11/1990 |

OTHER PUBLICATIONS

English Abstract of DE19950689, Oct. 21, 1999.

* cited by examiner

*Primary Examiner* — Karen Masih
(74) *Attorney, Agent, or Firm* — Dykema Gossett PLLC

(57) ABSTRACT

An actuator system, preferably for patient lifters, includes at least one actuator driven by an electric motor, a control unit having a power limiting circuit, and at least one handset having a plurality of keys. The actuator system is arranged such that the threshold value of the maximum permissible power in the power limiting circuit may be changed, and that this change may be performed via a key on the handset. Thus, it is possible to subsequently adjust the cutout limit safely and easily via a key on a handset, so that the cutout limit may be adapted to the actual application into which the actuator system is to be incorporated. For reasons of safety, it is preferred to use a separate handset for changing the threshold value.

4 Claims, 1 Drawing Sheet

ACTUATOR SYSTEM

BACKGROUND OF THE INVENTION

1. Field of the Invention

The invention relates to an actuator system and to a method of ensuring that at least one actuator in the actuator system cannot yield more than a maximum permissible force.

2. The Prior Art

For convenience, the disclosure of the invention will be based on patient lifters as disclosed e.g. in DE 199 50 689 A1 to Okin. The patient lifter comprises a frame provided with wheels and having a cantilever which is rotatable about a horizontal axis. A lifting sling for the patient may be secured at the end of the cantilever. Raising and lowering of the patient is performed by a linear actuator which is mounted on the frame and is connected with the cantilever. It is a safety requirement (standard EN1531) that patient lifters must not be capable of lifting more than one and one-half times the specified maximum load.

In order to meet this requirement in a simple manner in terms of costs and structure, it is turned to account that there is a direct relation between power consumption and load. Typically, a power cutout circuit is thus provided, which cuts out the power corresponding to one and one-half times the specified maximum load. This limit is preset by the manufacturer and can not be changed subsequently or only be changed with difficulty subsequently. However, the problem is that there is a great spread of the power necessary to lift a given load, which means that, in reality, the patient lifters can lift far more than the permissible load. It is not readily possible to limit the spread of the power in an acceptable manner.

The object of the invention is to provide an actuator system by means of which it may be ensured in a simple manner that the permissible load cannot be exceeded.

SUMMARY OF THE INVENTION

This is achieved according to the invention by constructing the actuator system to include a means for changing and storing a threshold value of maximum permissible power in the power limiting circuit of the actuator system. When the threshold value of the maximum permissible power in the power limiting circuit may be changed from an external key in the system, it is possible to adjust subsequently in a simple manner when the actuator system is incorporated in the desired application. When the actuator system is loaded by the maximum permissible load, the threshold value of the power may be changed accordingly in a simple manner, thus ensuring that the actuator system cannot lift more than the permissible load. The key for recording the maximum power may be a lockable key on an ordinary control, but for reasons of safety it is preferred to use a control designed especially for the purpose.

A method of ensuring that at least one actuator in an actuator system cannot yield more than a maximum permissible force determined by a threshold value of the power in a power limiting circuit, is characterized in that the actuator is loaded until it yields the maximum permissible force, and that the corresponding power is recorded and entered as a threshold value into the power limiting circuit. For reasons of safety, it is preferred to use a handset especially adapted for the purpose, which is connected temporarily when the threshold value in the power limiting circuit is determined. The threshold value cannot be changed by the usual handset, thus ensuring that the threshold value cannot be changed inappropriately.

BRIEF DESCRIPTION OF THE DRAWINGS

The invention will be described more fully below with reference to the accompanying drawings.

DETAILED DESCRIPTION OF THE PREFERRED EMBODIMENT

Figure 1:
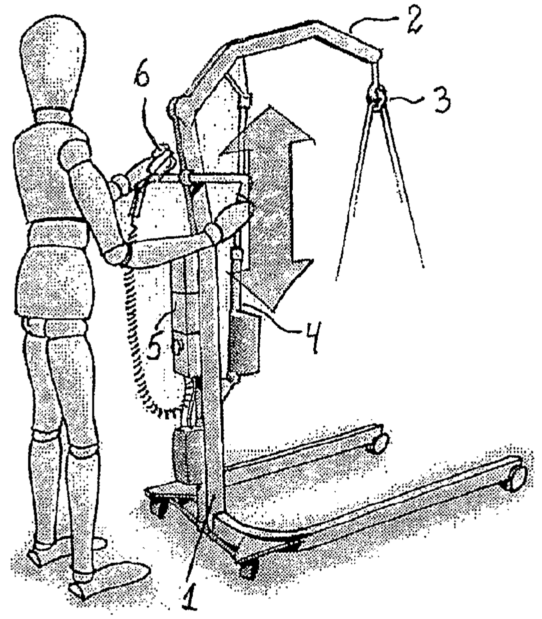
FIG. 1 shows a patient lifter seen from the side.

The patient lifter shown in FIG. 1 comprises a frame 1 provided with wheels. A cantilever 2 is secured at one end to the frame and is rotatable about a horizontal axis. A lifting hook 3 for lifting a patient is secured to the other end of the cantilever. The cantilever may be raised and lowered by a linear actuator 4, e.g., of the type defined in EP 531 247 B1 or EP 647 799 B1, which is secured at its one end to the frame, and whose other end is secured to the cantilever. A control box 5 is mounted on the frame, containing a control unit and rechargeable batteries for operating the actuator. A handset 6 is connected to the control unit for maneuvering the cantilever.

Figure 2:
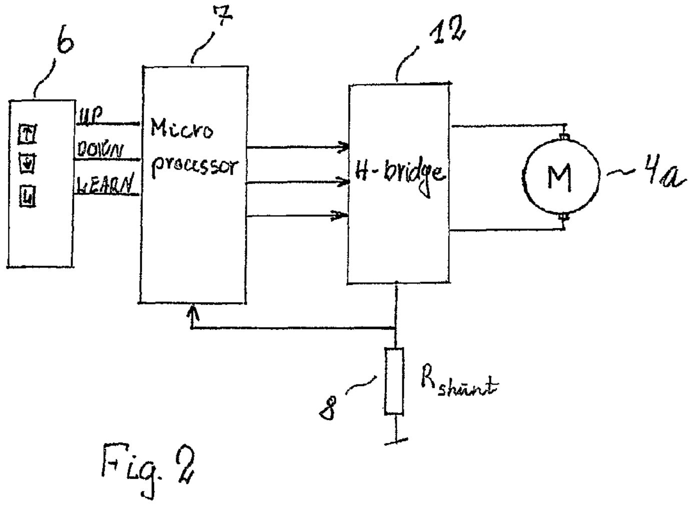
FIG. 2 shows an overall diagram.
Figure 3:
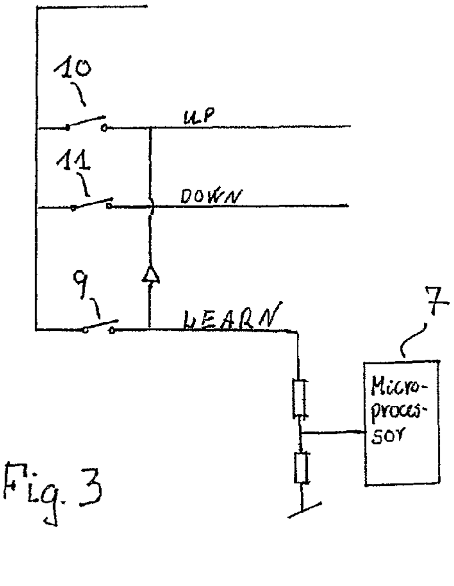
FIG. 3 shows a diagram of the handset.

FIG. 2 shows an overall diagram with a microprocessor 7 in the control box 5 and connected to the handset 6. Also indicated is a DC motor 4*a* in the actuator 4, whose direction of rotation is controlled by an H bridge 12 connected to the microprocessor 7. Measurement of the actual power strength is performed across a measurement resistance 8, and the power strength is recorded by the microprocessor 7 and is stored in a memory, e.g. a flash or an EPROM memory. FIG. 3 shows a diagram of a special 20. handset having a learn key 9 and two keys 10, 11 for raising and lowering the cantilever. The learn key 9 is connected to the channel for raising the cantilever.

To activate the system, the usual handset is replaced by the special handset having the learn key 9, whereby the microprocessor in the control box is activated. Prior to this, the actuator and the control box have been mounted on the patient lifter concerned, and the maximum permissible load is provided on the cantilever of the patient lifter. When this has been ensured, the learn key on the handset is operated, which causes the actuator to run in an outward direction for full length of stroke. While the learn key is kept down, the internal circuit continuously measures the actual power to the actuator which this draws in order to lift the given load. After completed run, the greatest measured power strength in the microprocessor is stored and will thereby be defined as the threshold value of the maximum permissible power in the power limiting circuit. If the actuator draws a greater power because of a load above the permissible one, the power to the actuator is cut out. If at some later point the actuator or the control box is replaced on the patient lifter concerned, then the learn function is repeated in order to ensure that the cutout power is achieved on the basis of the mounted system. For reasons of safety, it is not possible to store a greater cutout power than 10A.

In the exemplary embodiment, the key for changing and recording the threshold value of the maximum permissible power strength is disposed on a handset, but this is not absolutely necessary, as, instead, the key may disposed e.g. on the control box.

Thus, the idea of the invention is that it must be simple to adjust a cutout limit subsequently on a given actuator system. With the invention, it is possible to adjust the cutout limit subsequently via a key in a simple and easy manner, so that it may be adapted to the given application into which the actuator system is to be incorporated.

The invention claimed is:

1. An actuator system, comprising at least one actuator driven by an electric motor, a power supply, a control unit having a power limiting circuit, and at least one handset having a plurality of keys and means for changing and storing a threshold value of maximum permissible power in the power limiting circuit, the change performed via a key.

2. The actuator system according to claim 1, wherein the handset has a special key for changing the threshold value of the power.

3. A method of ensuring that an actuator in an actuator system cannot yield more than a maximum permissible load, the method comprising the steps of:

loading the actuator with a maximum permissible load, recording a corresponding power consumption of the actuator, and entering the recorded power consumption as a threshold value into a power limiting circuit for the actuator so that the actuator cannot yield more than said maximum permissible load.

4. A method according to claim 3, wherein recording and storing of the threshold value in the power limiting circuit is performed by means of a handset adapted for the purpose.

* * * * *